US011405069B2

(12) United States Patent
Cho et al.

(10) Patent No.: US 11,405,069 B2
(45) Date of Patent: Aug. 2, 2022

(54) ELECTRONIC DEVICE AND METHOD FOR TRANSMITTING UPLINK REFERENCE SIGNAL

(71) Applicant: Samsung Electronics Co., Ltd., Suwon-si (KR)

(72) Inventors: Namjun Cho, Suwon-si (KR); Geunwoo Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 217 days.

(21) Appl. No.: 16/657,608

(22) Filed: Oct. 18, 2019

(65) Prior Publication Data

US 2020/0127698 A1   Apr. 23, 2020

(30) Foreign Application Priority Data

Oct. 18, 2018   (KR) ................. 10-2018-0124501

(51) Int. Cl.
*H04B 1/401* (2015.01)
*H04B 1/00* (2006.01)
(Continued)

(52) U.S. Cl.
CPC ........... *H04B 1/401* (2013.01); *H04B 1/0057* (2013.01); *H04B 1/44* (2013.01); *H04L 5/0051* (2013.01); *H04L 25/0226* (2013.01)

(58) Field of Classification Search
CPC ........ H04B 1/0057; H04B 1/006; H04B 1/40; H04B 1/401; H04B 1/44; H04B 1/48;
(Continued)

(56) References Cited

U.S. PATENT DOCUMENTS 8,514,918 B2   8/2013 Cohen
8,532,588 B1   9/2013 Weber et al.
(Continued)

FOREIGN PATENT DOCUMENTS

CN   1855698 A   11/2006
CN   103166690 A   6/2013
(Continued)

OTHER PUBLICATIONS

Huawei, et al., SRS antenna switching, R1-1709938, 3GPP TSG RAN WG1 NR Ad Hoc Meeting, Qingdao, China, Jun. 27-30, 2017, 4 pages.
(Continued)

*Primary Examiner* — Young T. Tse

(57) ABSTRACT

An electronic device including: an antenna; a first switch functionally connected to the antenna and configured to perform switching to connect the antenna with a transmission path or a reception path; a first filter and a first amplifier configured to form the reception path; a second filter and a second amplifier configured to form the transmission path; a Radio Frequency Integrated Circuit (RFIC) connected to the reception path and the transmission path and configured to process an RF signal; and at least one processor configured to control the RFIC and the first switch such that a transmission signal generated by the RFIC is radiated from the antenna via the transmission path.

10 Claims, 9 Drawing Sheets

(51) Int. Cl.
*H04L 25/02* (2006.01)
*H04B 1/44* (2006.01)
*H04L 5/00* (2006.01)

(58) Field of Classification Search
CPC . H04L 5/0001; H04L 5/0051; H04L 25/0224; H04L 25/0226
USPC ......... 375/219–222, 260, 267, 349; 370/334, 370/337, 344, 347; 455/500, 78, 80, 83, 455/84, 88
See application file for complete search history.

(56) References Cited

U.S. PATENT DOCUMENTS

| | | | |
|---|---|---|---|
| 9,780,735 B1* | 10/2017 | Obiya | H03F 3/195 |
| 2003/0190903 A1* | 10/2003 | Melamed | H04B 7/0805 |
| | | | 455/574 |
| 2003/0231446 A1* | 12/2003 | Leete | H01L 27/0251 |
| | | | 361/56 |
| 2004/0198420 A1* | 10/2004 | He | H04B 1/48 |
| | | | 455/552.1 |
| 2006/0063494 A1 | 3/2006 | Zhang et al. | |
| 2006/0276227 A1* | 12/2006 | Dravida | H04B 7/0413 |
| | | | 455/562.1 |
| 2008/0119230 A1* | 5/2008 | Guda | H04B 7/0805 |
| | | | 455/562.1 |
| 2009/0174475 A1* | 7/2009 | Yuen | H03F 1/0216 |
| | | | 330/133 |
| 2009/0207764 A1* | 8/2009 | Fukamachi | H04B 1/44 |
| | | | 370/297 |
| 2012/0156820 A1* | 6/2012 | Kim | H01H 1/0036 |
| | | | 438/50 |
| 2013/0217343 A1 | 8/2013 | Tenbroek et al. | |
| 2014/0162574 A1 | 6/2014 | Rousu et al. | |
| 2018/0109336 A1 | 4/2018 | Nardozza | |
| 2018/0152955 A1 | 5/2018 | Park et al. | |
| 2018/0227008 A1* | 8/2018 | Obiya | H04B 1/00 |
| 2018/0262231 A1 | 9/2018 | Pusl, III et al. | |
| 2018/0343000 A1* | 11/2018 | Nosaka | H04B 1/48 |
| 2019/0260128 A1 | 8/2019 | Sugaya | |
| 2021/0204229 A1* | 7/2021 | Miao | H04W 52/367 |

FOREIGN PATENT DOCUMENTS

| | | |
|---|---|---|
| CN | 104541407 A | 4/2015 |
| CN | 207518592 U | 6/2018 |
| CN | 108462506 A | 8/2018 |
| EP | 3442077 A1 | 2/2019 |
| EP | 3540953 A1 | 9/2019 |
| JP | H10154947 A | 6/1998 |
| KR | 10-2014-0012496 A | 2/2014 |
| WO | 2017/175964 A1 | 10/2017 |
| WO | 2018/101112 A1 | 6/2018 |

OTHER PUBLICATIONS

International Search Report dated Feb. 7, 2020 in connection with International Patent Application No. PCT/KR2019/013758, 3 pages.
Written Opinion of the International Searching Authority dated Feb. 7, 2020 in connection with International Patent Application No. PCT/KR2019/013758, 7 pages.
Supplementary Partial European Search Report dated Aug. 4, 2021 in connection with European Patent Application No. 19 87 3771, 12 pages.
European Patent Office, "Supplementary European Search Report" dated Dec. 8, 2021, in connection with European Patent Application No. 19873771.0, 13 pages.
China National Intellectual Property Administration, "Notification of the First Office Action," dated Mar. 25, 2022, in connection with Chinese Patent Application No. 201980067991.6, 12 pages.
Wang, "Design method of RF power detection and control system," Institute of Physics and Optoelectronics Technology, Baoji University of Arts and Science, Baoji, China, Aug. 2016, 6 pages.

* cited by examiner

ELECTRONIC DEVICE AND METHOD FOR TRANSMITTING UPLINK REFERENCE SIGNAL

CROSS-REFERENCE TO RELATED APPLICATIONS

This application is based on and claims priority under 35 U.S.C. 119 to Korean Patent Application No. 10-2018-0124501, filed on Oct. 18, 2018, in the Korean Intellectual Property Office, the disclosure of which is herein incorporated by reference in its entirety.

BACKGROUND

1. Field

The disclosure relates to an electronic device and a method for transmitting an uplink reference signal.

2. Description of Related Art

The above information is presented as background information only to assist with an understanding of the disclosure. No determination has been made, and no assertion is made, as to whether any of the above might be applicable as prior art with regard to the disclosure.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

SUMMARY

A precoding scheme used when a base station transmits a Downlink (DL) Multiple Input Multiple Output (MIMO) signal to an electronic device in a Long Term Evolution (LTE) communication environment depends only on Precoding Matrix Indicator (PMI) or Channel Quality Indicator (CQI) information, fed back by the electronic device, and thus has a limit on performance.

In order to overcome the limit of the MIMO that depends only on the PMI or CQI information, an SRS switching technology has been presented. The SRS switch technology is to allow the base station to measure a channel quality of the electronic device as the electronic device transmits a Sounding Reference Signal (SRS) signal to the base station.

The electronic device may need an additional switch or wire to transmit the SRS signal to the base station. However, according to a limit mounting space of the electronic device, a method of implementing the SRS switching technology while minimizing the additional switch or wire may be required.

In accordance with an aspect of the disclosure, an electronic device is provided. The electronic device includes: an antenna; a first switch functionally connected to the antenna and configured to perform switching to connect the antenna with a transmission path or a reception path; a first filter and a first amplifier configured to form the reception path; a second filter and a second amplifier configured to form the transmission path; a Radio Frequency Integrated Circuit (RFIC) connected to the reception path and the transmission path and configured to process an RF signal; and at least one processor configured to control the RFIC and the first switch such that a transmission signal generated by the RFIC is radiated from the antenna via the transmission path.

In accordance with another aspect of the disclosure, the electronic device further includes: a plurality of antennas, a plurality of first switches, a plurality of reception paths, and a second switch, the second switch being configured to perform switching to connect the transmission path with one of the plurality of first switches, wherein the at least one processor is configured to control the RFIC, the plurality of first switches, and the second switch such that the transmission signal generated by the RFIC is radiated from one of the plurality of antennas via the transmission path.

The technical subjects pursued in the disclosure may not be limited to the above mentioned technical subjects, and other technical subjects which are not mentioned may be clearly understood, through the following descriptions, by those skilled in the art of the disclosure.

An electronic device according to various embodiments transmits a Sounding Reference Signal (SRS) to a base station through a reception antenna, so that the base station can accurately measure a channel condition for each antenna of the electronic device and support MIMO.

An electronic device according to various embodiments uses an FEM including a DPDT switch so as to minimize additional switches or wires and perform sounding reference signal transmission and calibration, thereby overcoming restriction on components, arrangement, and wires.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
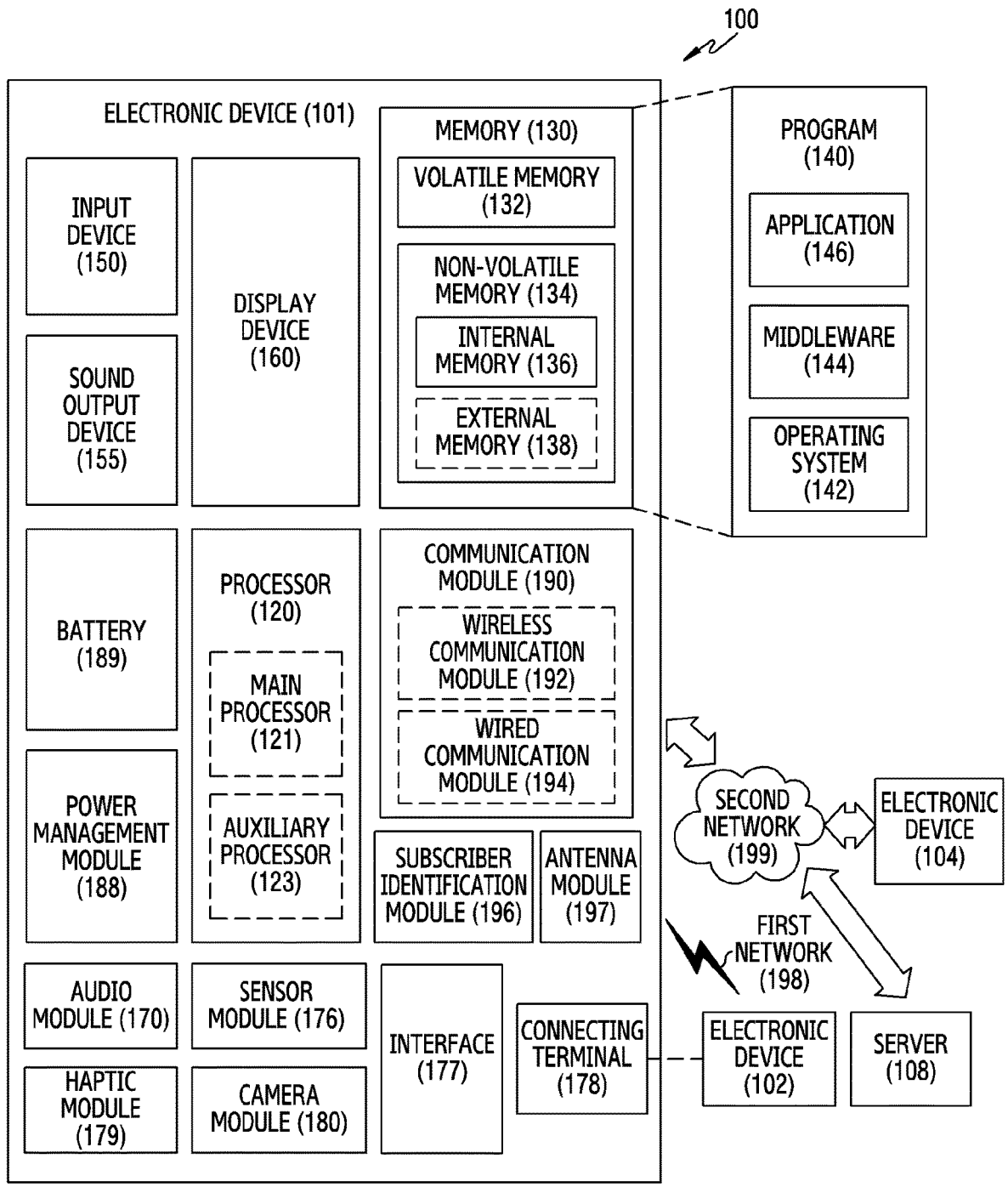
FIG. 1 illustrates a block diagram of an electronic device within a network environment according to various embodiments of the disclosure.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
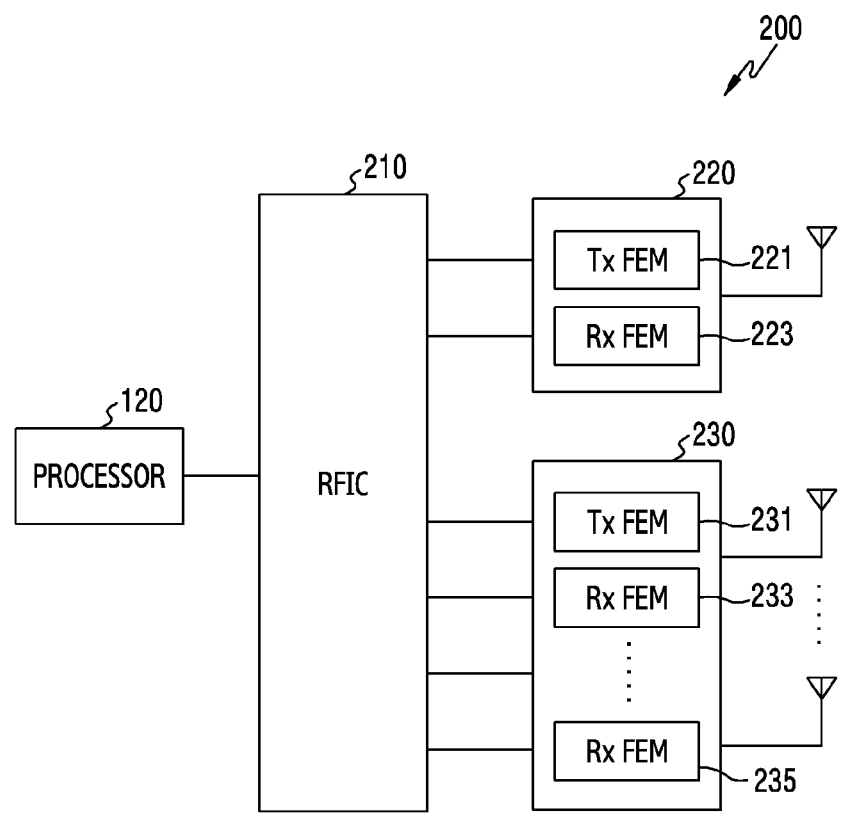
FIG. 2 illustrates a functional configuration of the electronic device according to various embodiments.

FIG. 2 illustrates a block diagram 200 of a communication-related circuit of the electronic device 101 according to various embodiments.

The communication-related circuit of the electronic device 101 according to various embodiments may include the processor 120, a Radio Frequency Integrated Circuit (RFIC) 210, and one or more Front End Modules (FEMs)

220 and 230. The processor 120 may be modem that processes a communication signal. The FEMs 220 and 230 may connect an antenna of the electronic device 100 and the RFIC 210 to deliver a transmitted or received signal and may have a modularized form of a switch or a filter. The FEMs 220 and 230 may be divided into reception (Rx) FEMs 223, 233, and 235 for filtering and amplifying a received signal and transmission (Tx) REMs 221 and 231 for filtering and amplifying a transmitted signal. Further, the FEMs 220 and 230 may be divided into the FEM 220 capable of supporting legacy communication such as a $2^{nd}$-generation communication network, a $3^{th}$-generation communication network, and a Long Term Evolution (LTE) communication network and the FEM 230 capable of supporting a $5^{th}$-generation (5G) communication network.

According to various embodiments, although the embodiment of FIG. 2 illustrates that the FEM 220 supporting legacy communication includes one transmission FEM 221 and one reception FEM 223, the disclosure is not limited thereto, and the FEM 220 may include a plurality of transmission FEMs 221 and a plurality of reception FEMs 223 and may be connected to a plurality of antennas.

According to various embodiments, although the embodiment of FIG. 2 illustrates that the FEM 230 supporting the 5G communication network includes one transmission FEM 231 and a plurality of reception FEMs 233 and 235, but the disclosure is not limited thereto, and the FEM 230 may include one transmission FEM and one reception FEM per antenna.

According to various embodiments, the embodiment of FIG. 2 illustrates that the electronic device 101 includes both the FEM 220 supporting legacy communication and the FEM 230 supporting 5G communication network, but the disclosure is not limited thereto, and the electronic device 101 may include only the FEM 220 supporting legacy communication or the FEM 230 supporting 5G communication network. According to an embodiment, the electronic device may include an FEM supporting a plurality of legacy communication or an FEM 230 supporting a plurality of 5G networks.

According to various embodiments, the RFIC 210 may receive a baseband signal from the processor 120, up-convert a frequency of the received base band signal into a radio frequency band signal, or down-convert the radio frequency band signal received through the FEM 220 or 230 into the baseband signal.

According to various embodiments, the communication-related circuit may include an Intermediate Frequency Integrated Circuit (IFIC), which is not shown, at a front end of the RFIC 210. According to an embodiment, the IFIC may receive a baseband signal from the processor 120 (or modem) and up-convert a frequency of the received baseband signal into an intermediate frequency band. The signal up-converted into the intermediate frequency band may be referred to as an IF signal. According to an embodiment, the IFIC may receive an IF signal of an intermediate frequency band from the RFIC 210 and down-convert the frequency band of the received IF signal into a baseband frequency.

According to another embodiment, the RFIC 210 may receive an IF signal of an intermediate frequency band from the IFIC and up-convert the frequency band of the received IF signal into a radio frequency band. According to another embodiment, the RFIC 210 may receive a baseband signal from the processor 120 or the modem and up-convert the received baseband signal into a radio frequency band. The signal up-converted into the radio frequency band may be referred to as an RF signal. The RF signal may be transmitted to an external electronic device (for example, the electronic device 102) through the transmission FEMs 221 and 231 and an antenna. According to another embodiment, the RFIC 210 may receive an RF signal through a plurality of antennas and the reception FEMs 223, 233, and 235 and down-convert the frequency band of the received RF signal into an intermediate frequency band or baseband signal.

According to various embodiments, the RFIC 210 may be separately provided per FEM 220 or 230, and may be integrated with each of the FEMs 220 and 230. For example, a first RFIC may be integrated with the first FEM 220 and a second RFIC may be integrated with the second FEM 230. In this case, the second RFIC may down-convert the RF signal received through the antenna connected to the second FEM 230 into an IF signal of an intermediate frequency band or a baseband signal.

According to various embodiments, the FEMs 220 and 230 may receive radio signals from an external electronic device (for example, the electronic device 102 or the base station) through a connected antenna and transmit the received radio signals to the RFIC 210. According to various embodiments, each of the FEMs may be disposed on a PCB separated from a Printed Circuitry Board (PCB) on which the processor 120 and/or the RFIC 210 are disposed. According to various embodiments, each of the plurality of FEMs may be connected to the RFIC 210 through a connection member. The connection member may include at least one of a Flexible PCB (FPCB) or a coaxial cable.

According to various embodiments, the antenna may radiate RF signals received from the transmission FEMs 221 and 231 in an electromagnetic wave form. Further, the antenna may receive the RF signal transmitted from the external electronic device in the electromagnetic wave form and transmit the same to the RFIC 210 via the FEM 223, 233, or 235.

According to various embodiments, the FEMs 220 and 230 may switch transmission or reception of the signal. When a Time Division Duplex (TDD)-based communication network is executed, the FEMs 220 and 230 may switch transmission and reception of the signal by controlling switches included in the FEMs 220 and 230. The FEMs 220 and 230 may control the switches so as to connect the antennas with transmission paths via the transmission FEMs 221 and 231. The antenna may receive a transmission signal from the RFIC 210 through the transmission path and radiate the received transmission signal in an electromagnetic wave form. In another example, the FEMs 220 and 230 may control the switches so as to connect the antennas with reception paths via the reception FEMs 223, 233, and 235. The signals received through the antennas may be transmitted to the RFIC 210 through the connected reception paths. When the TDD-based communication network is executed, transmission and reception of the signal are switched by the control of the switch and the same frequency band is used for transmission and reception, so that the wireless transmission path and the wireless reception path of the electronic device 101 may be the same.

According to various embodiments, the FEMs 220 and 230 may simultaneously transmit and receive signals. When a Frequency Division Duplex (FDD)-based communication network is executed, the electronic device 101 may separate a transmission signal and a reception signal by a duplexer between the FEMs 220 and 230 and the antennas. The reception signals received through the antennas may be transmitted to the reception paths via the duplexers and the reception FEMs 223, 233, and 235 and the transmission signals transmitted from the RFIC 210 may be radiated by the antennas via the transmission FEMs 221 and 231 and the duplexers at the same time. In the case of the FDD-based communication network, a frequency band for the transmission signal is different from a frequency band for the reception signal, so that the wireless transmission path is different from the wireless reception path and thus channel characteristics may be different. Accordingly, as the electronic device 101 uses the SRS switching technology for transmitting the SRS signal to the base station through the wireless reception path, the base station may measure a channel quality of the reception path of the electronic device 101.

A detailed circuit configuration for implementing the SRS switching technology will be described below.

Hereinafter, transmission of an SRS used in a Long Term Evolution (LTE) communication network is described, but it is apparent to those skilled in the art that a predetermined transmission signal may replace the SRS if a transmission circuit is configured. Particularly, in the case of the TDD-based communication network, it is apparent to those skilled in the art that a UL transmission signal may be transmitted using a circuit configuration described below.

Figure 3A:
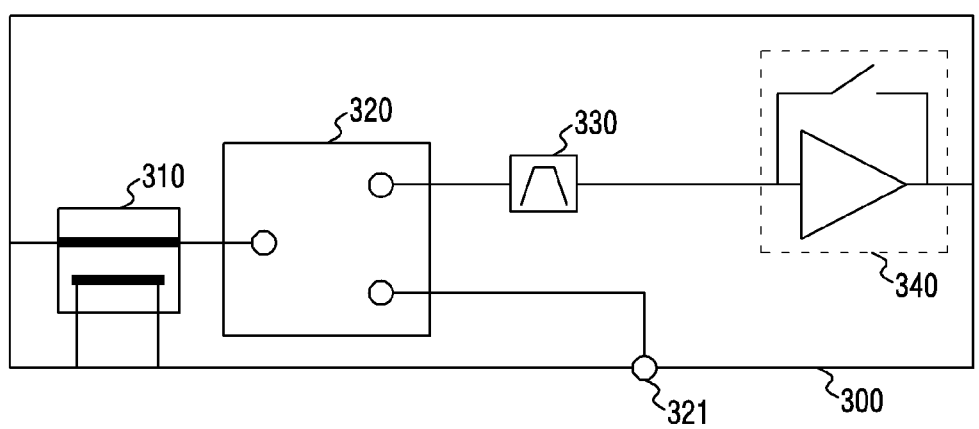
FIG. 3A illustrates a reception Front End Module (FEM) according to various embodiments of the disclosure.

FIG. 3A illustrates a Front-End Module (FEM) according to various embodiments.

Referring to FIG. 3A, a reception FEM 300 may correspond to the reception FEMs 233 and 235 illustrated in FIG. 2.

Referring to FIG. 3A, the FEM 300 capable of transmitting a Sounding Reference Signal (SRS) through a reception antenna may include a coupler 310, a Single Pole Double Throw (SPDT) switch 320, a filter 330, and an amplifier 340. In an embodiment, the amplifier 340 may be a Low-Noise Amplifier (LNA).

According to various embodiments, the coupler 310 may generate a feedback signal. The feedback signal may be generated on the basis of a transmission signal or a reception signal. For example, when the TDD-based communication network is executed, the electronic device 101 may transmit a signal to an external electronic device (for example, the electronic device 102 or the base station). The transmission signal may be transmitted from the RFIC 210 to the coupler 310 through a transmission path. The coupler 310 may generate the feedback signal proportional to an intensity of the transmission signal on the basis of a change in an ambient electromagnetic field generated as the transmission signal passes therethrough. The feedback signal may have an intensity lower than that of the transmission signal. In another example, when the TDD-based communication network is executed, the electronic device 101 may receive a signal from the external electronic device. The reception signal may be received through the antenna. The reception signal received through the antenna may be transmitted to the filer 330 through the coupler 310. The coupler 310 may generate the feedback signal proportional to an intensity of the reception signal on the basis of a change in an ambient electromagnetic field generated by the reception signal passing through the coupler 310.

According to various embodiments, the SPDT switch 320 may perform control to connect the coupler 310 with one of the transmission path and the reception path. When the TDD-based communication network is executed, the SPDT switch 320 may perform switching between a first state and a second state. The first state may correspond to a state connected to the reception path in which the antenna includes the coupler 310 and the amplifier 340. The second state may correspond to a state in which the antenna is connected to the transmission FEM 231. The transmission FEM 231 may receive a signal from the RFIC 210 and transmit a signal to one of the plurality of reception FEMs 233 and 235. According to various embodiments, in order to transmit an Uplink (UP) signal, the SPDT switch 320 may enter the second state during a transmission slot. In order to receive a Downlink (DL) signal, the SPDT switch 320 may enter the first state during a reception slot.

According to various embodiments, the filter 330 may filter a frequency band of the reception signal. The filter 330 may be included in a path through which the reception signal is transmitted, that is, a reception path. The filter 330 may make only a signal of a predetermined frequency band pass therethrough and cut off signals other than the predetermined frequency band, so as to remove noise.

According to various embodiments, the amplifier 340 may amplify a signal. The reception signal which the electronic device 101 receives through the antenna may have a very low intensity. Accordingly, the amplifier 340 may amplify the intensity of the reception signal. The reception signal having the intensity increased through the amplifier 340 may be transmitted to the RFIC 210.

According to various embodiments, an SRS port 321 may be connected to the transmission FEM 231. For example, when the electronic device 101 transmits an SRS, the SRS may be transmitted from the RFIC 210 to the transmission FEM 231 and may be transmitted from the transmission FEM 231 to the reception FEMs 233 and 235 through the SRS port 321. According to various embodiments, the SRS port 321 may be connected to one terminal of the SPDT switch 320. That is, an input terminal of the SPDT switch 320 may be connected to the antenna, a first output terminal of the SPDT switch 320 may be connected to the filter 330, and a second output terminal of the SPDT switch 320 may be connected to the SRS port 321.

Figure 3B:
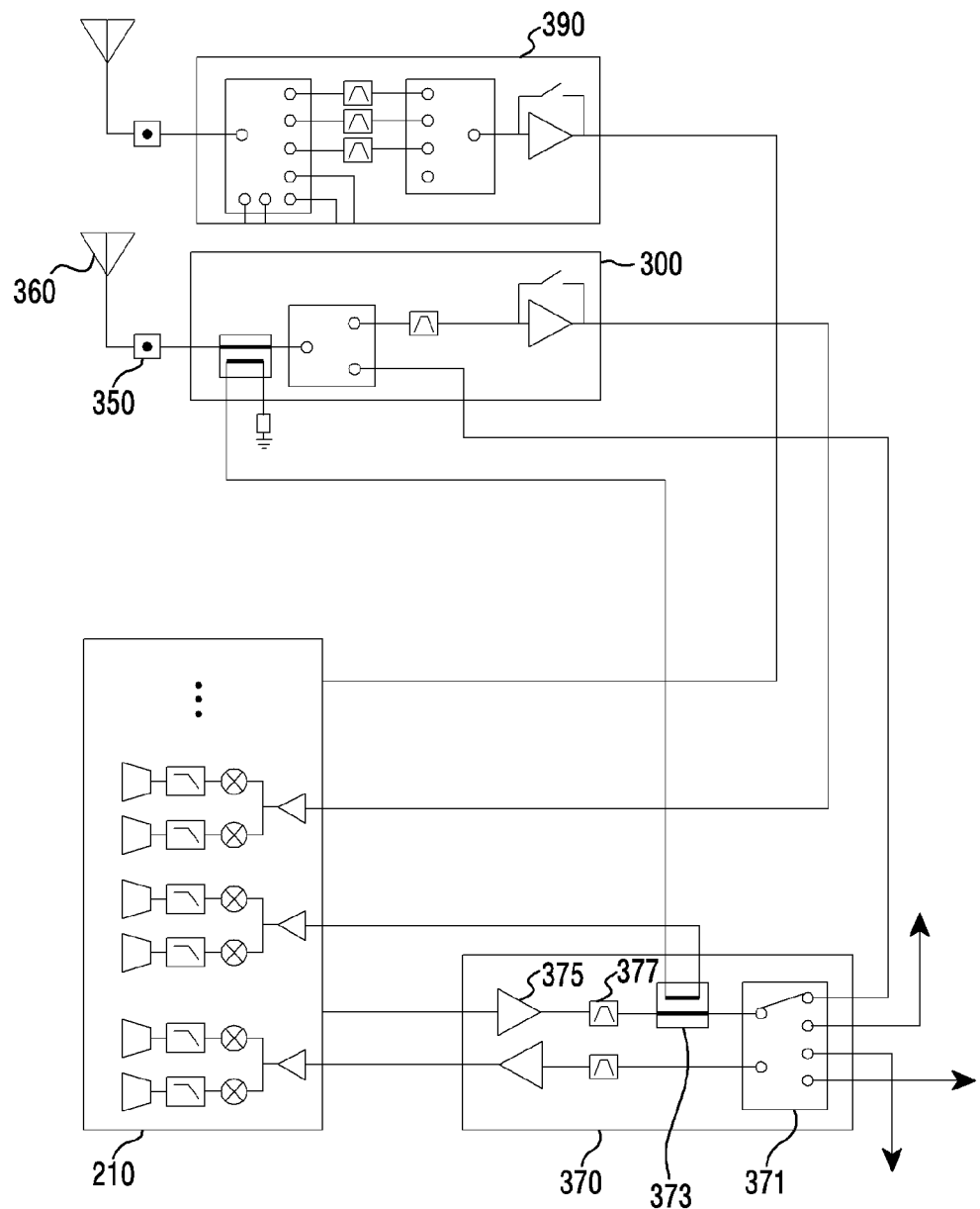
FIG. 3B illustrates the configuration of the electronic device for transmitting a Sounding Reference Signal (SRS) according to various embodiments of the disclosure.

FIG. 3B illustrates the configuration of the electronic device 101 for transmitting a Sounding Reference Signal (SRS) according to various embodiments of the disclosure.

Referring to FIG. 3B, the electronic device 101 may include an RFIC 210, a transmission/reception FEM 370, a first reception FEM 300, an RF switch 350, a first antenna 360, and a second reception FEM 390.

According to various embodiments, the transmission/reception FEM 370 may include the transmission FEM 231 and the reception FEM (for example, the reception FEM 233 or 235) of FIG. 2 to configure some or all of the FEM 230 of FIG. 2, the first reception FEM 300 may correspond to one reception FEM (for example, the reception FEM 233 or 235) of FIG. 2 or the reception FEM 300 illustrated in FIG. 3A, and the second reception FEM 390 may correspond to one reception FEM (for example, the reception FEM 223) of FIG. 2. Although FIG. 3B illustrates that the transmission/reception FEM 370 includes the transmission FEM and the reception FEM, the transmission FEM and the reception FEM included in the transmission/reception FEM 370 may be separated and the reception FEM may correspond to the reception FEM illustrated in FIG. 3A.

According to various embodiments, when the FDD-based communication network is executed, a transmission frequency band is different from a reception frequency band, so that there may be a separate transmission FEM for transmitting a general signal in the transmission frequency band and a separate transmission FEM for transmitting an SRS signal in the reception frequency band.

According to various embodiments, the transmission/reception FEM 370 may distribute transmission signals transmitted from the RFIC 210. The transmission/reception FEM 370 may include a transmission path, a reception path, and a switch 371. The switch 371 may distribute the transmission signal transmitted from the RFIC 210 to one of an antenna directly connected to the transmission/reception FEM 370 and the reception FEMs 233, 235, and 300. For example, the transmission/reception FEM 370 may transmit the transmission signal to the first reception FEM 300 or the fourth reception FEM 235 by controlling the switch 371.

According to various embodiments, the transmission/reception FEM 370 may be connected to the first reception FEM 300 and the fourth reception FEM 235. For example, the connection between the transmission/reception FEM 370 and the first reception FEM 300 may correspond to the connection between one terminal of the switch 371 included in the transmission/reception FEM 370 and the first reception FEM 300. The first reception FEM 300 may further include a port for a transmission signal. Accordingly, the transmission signal may be transmitted from the RFIC 210 to the transmission/reception FEM 370 or a transmission path of the transmission/reception FEM 370 and may be connected to the SRS port 321 of the first reception FEM 300 through the switch 371 of the transmission/reception FEM 370. In another example, the connection between the transmission/reception FEM 370 and the fourth reception FEM 235 may correspond to the connection between the another terminal of the switch 371 included in the transmission/reception FEM 370 and the fourth reception FEM 235. The second reception FEM 390 is illustrated as a reception FEM for legacy communication. In this case, a transmission FEM for separate legacy communication may be added, and a transmission signal may be received from the separate transmission FEM. According to various embodiments, the second reception FEM 390 may be connected to one terminal of the switch 371 of the transmission/reception FEM 370 of FIG. 3B without any transmission FEM for separate legacy communication and may receive a transmission signal. According to various embodiments, the second reception FEM 390 may be the reception FEM 300 of FIGS. 3A and 3B for the $5^{th}$ generation communication network rather than for legacy communication. In this case, the second reception FEM 390 may be connected to one terminal of the switch 371 of the transmission/reception FEM 370 and receive a transmission signal. In order to receive the transmission signal, the second reception FEM 390 may further include a port for the transmission signal. Accordingly, the transmission signal may be transmitted from the RFIC 210 to a transmission path of the transmission/reception FEM 370 and may be connected to a port for the transmission signal of the second reception FEM 390 through the switch 371 of the FEM 370.

According to various embodiments, the electronic device 101 may transmit an SRS through the antenna in a reception frequency band. For example, the electronic device 101 may transmit the SRS to an external electronic device (for example, the electronic device 102 or the base station) through the first antenna 360. The external electronic device may estimate channel quality between the external electronic device and the electronic device 101 may be estimated on the basis of the SRS transmitted from the electronic device 101. The external electronic device may increase channel efficiency by transmitting a signal optimal for the first antenna 360 on the basis of the estimated channel quality.

According to various embodiments, the electronic device 101 may transmit the SRS. For example, the electronic device 101 may transmit the SRS to the external electronic device through the first antenna 360. The processor 120 may perform control to make a request for transmitting the SRS, and the RFIC 210 may transmit the SRS through the transmission path within the transmission/reception FEM 370.

According to various embodiments, the transmission path of the transmission/reception FEM 370 may include an amplifier 375 and a filter 377, and may amplify and filter the SRS received from the RFIC 210. An intensity of the SRS may increase through the amplifier 375. As the SRS passes through the amplifier 375, signals other than the desired RF may be filtered through the filter 377. According to an embodiment, noise may be removed from the SRS through filtering by the filter 377. The noise may include white Gaussian noise. The filtered SRS may be transmitted to the switch 371 via a coupler 373. The switch 371 may correspond to a Multiple Pole Multiple Throw (MPMT) switch. The switch 371 may connect a transmission path of the SRS with the SRS port 321 of the first reception FEM 300 on the basis of control information from the processor 120 or the modem. The SRS may be transmitted to the first reception FEM 300 through the SRS port 321 and may be transmitted to the SPDT switch 320 connected to the SRS port 321 within the first reception FEM 300. The SPDT switch 320 may switch to a state in which the SRS is transmitted on the basis of the control information from the processor 120 or the modem. For example, the SPDT switch 320 may switch to connect the SRS port 321 and the first antenna 360. Accordingly, the SRS may be transmitted to the first antenna 360 through the SRS port 321 and transmitted to an external electronic device through the first antenna 360.

According to various embodiments, the electronic device 101 may perform calibration for transmission of the SRS. The calibration may refer to correction to transmit a signal through an actual antenna with a target power value in consideration of signal loss generated while the signal passes a transmission path and/or a reception path. According to various embodiments, the transmission/reception FEM 370 may generate a first feedback signal. The first feedback signal may correspond to a signal coupled by the coupler 373 on the basis of the SRS passing through the amplifier 375 and the filter 377. According to various embodiments, the first reception FEM 300 may generate a second feedback signal. The second feedback signal may correspond to a signal coupled by the coupler 310 included in the first reception FEM 300. The second feedback signal may have an intensity lower than the first feedback signal. This is because electrical loss may be caused by a connection member from the coupler 373 included in the transmission FEM of the transmission/reception FEM 370 to the coupler 310 of the first reception FEM 300. A difference between a power value of the first feedback signal and a power value of the second feedback signal may be determined as a transmission power offset.

According to various embodiments, the electronic device 101 may store a target power value required for successfully transmitting the SRS to an external electronic device (for example, the electronic device 102 or the base station). The target power value corresponds to a power value required at a time point at which a signal is transmitted through an antenna, and thus the processor 120 may perform control to transmit the SRS with a power value obtained by adding the transmission power offset and the target power value by controlling gain values of a plurality of amplifiers (for example, the amplifier of the RFIC 210 and the amplifier 375 of the transmission/reception FEM 370).

Figure 4A:
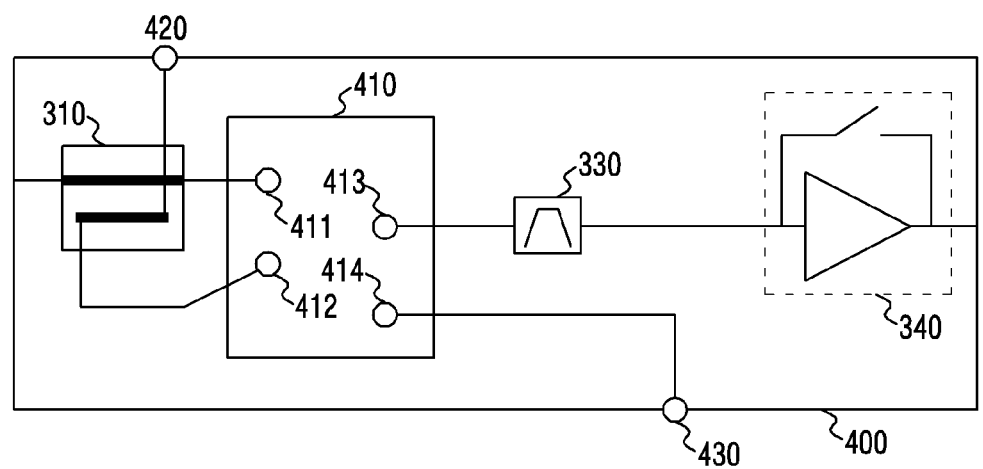
FIG. 4A illustrates a reception FEM according to various embodiments of the disclosure.

FIG. 4A illustrates a reception Front End Module (FEM) according to various embodiments of the disclosure.

Referring to FIG. 4A, a reception FEM 400 may include a coupler 310, a DPDT switch 410, a filter 330, and an amplifier 340.

According to various embodiments, the coupler 310, the filter 330, and the amplifier 340 may correspond to the coupler 310, the filter 330, and the amplifier 340 illustrated in FIG. 3A.

According to various embodiments, the DPDT switch 410 may include two input terminals 411 and 412 and two output terminals 413 and 414. The first input terminal 411 of the two input terminals may be connected to the antenna through the coupler 310. The first input terminal 411 connected to the antenna may be selectively connected to a reception path of the first output terminal 413 or a transmission path of the second output terminal 414. For example, the first input terminal 411 may be connected to a transmission path. The transmission path may correspond to a path through which an SRS transmitted to an external electronic device (for example, the electronic device 102 or the base station) is transmitted through the antenna. Referring to FIG. 4A, the transmission path may correspond to a path from the RFIC 210 to the SRS port 430. In another example, the first input terminal 411 may be connected to a reception path. The reception path may correspond to an electrical path through which the signal received from the external electronic device is transmitted to the RFIC 210 through the antenna. Referring to FIG. 4A, the reception path may correspond to a path to the RFIC 210 through the coupler 310, the filter 330, and the amplifier 340.

According to various embodiments, the second input terminal 412 of the two input terminals of the DPDT switch 410 may be connected to a terminal of the coupler 310, which is not connected to the antenna. The coupler 310 may generate a feedback signal of the SRS transmitted to the antenna through the first input terminal 411.

According to various embodiments, the DPDT switch 410 may correspond to one of a first state and a second state. For example, the first state may correspond to a state in which the first input terminal 411 and the first output terminal 413 are connected to each other and the second input terminal 412 and the second output terminal 414 are connected to each other. In another example, the second state may correspond to a state in which the first input terminal 411 and the second output terminal 414 are connected to each other and the second input terminal 412 and the first output terminal 413 are connected to each other.

According to various embodiments, the DPDT switch 410 may be in the first state during reception slots of a TDD communication system or during all slots except for slots for SRS transmission in an FDD communication system. That is, the DPDT switch 410 may electrically connect the antenna and the reception path by connecting the first input terminal 411 and the first output terminal 413 during reception slots. The signal received through the antenna may be transmitted to the RFIC 210 through the electrically connected reception path.

According to various embodiments, the DPDT switch 410 may be in the second state during transmission slots of the TDD communication system or during slots for SRS transmission in the FDD communication system. That is, the DPDT switch 410 may electrically connect the antenna and the transmission path by connecting the first input terminal 411 and the second output terminal 414 during transmission slots. For example, the SRS may be transmitted from the RFIC 210 to the first reception FEM 400 through the transmission/reception FEM 370 and the SRS port 430. The SRS may be transmitted to the second output terminal 414 through the SRS port 430 and may be transmitted to the first input terminal 411 by switching to the second state. The SRS may be transmitted to the external electronic device through the antenna connected to the first input terminal 411.

Figure 4B:
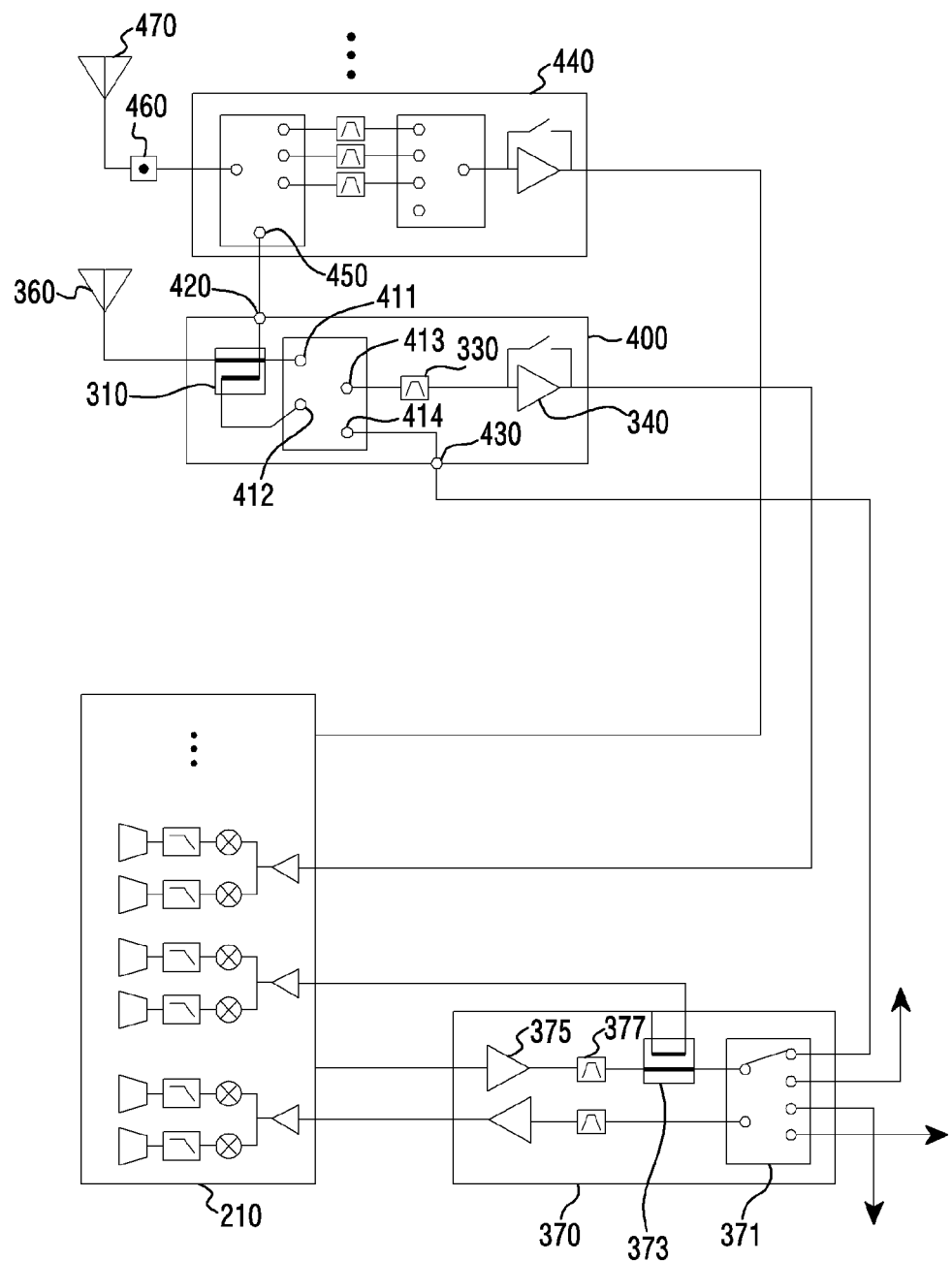
FIG. 4B illustrates the configuration of the electronic device for transmitting the SRS according to various embodiments of the disclosure.

FIG. 4B illustrates the configuration of the electronic device for transmitting the SRS according to various embodiments of the disclosure.

The electronic device 101 according to various embodiments may include an RFIC 210, a transmission/reception FEM 370, a first reception FEM 400, a first antenna 360, a second reception FEM 440, and a second antenna 470. The transmission/reception FEM 370 may include a transmission FEM and a reception FEM, and the transmission FEM and the reception FEM may be implemented to be separate from each other. A detailed description of the RFIC 210 and the transmission/reception FEM 370 may refer to the description of FIG. 3B. A detailed description of the first reception FEM 400 may refer to the description of FIG. 4A.

The second antenna 470 and the second reception FEM 440 according to various embodiments may support legacy communication. The legacy communication may include at least one of the remaining communication networks except for the 5G communication network. For example, the legacy communication may include at least one of a $2^{nd}$-generation communication network, a $3^{th}$-generation communication network, and a Long Term Evolution (LTE) communication network.

According to various embodiments, the second reception FEM 440 may include an auxiliary port 450. The auxiliary port 450 may correspond to a reserve terminal for processing a signal of a frequency band that is not supported by the legacy communication among the signals received through the second antenna 470. According to various embodiments, the auxiliary port 450 may be connected to a port for an electrical connection with the coupler 310 of the first reception FEM 400, for example, an ISO port 420. According to various embodiments, the number of auxiliary ports 450 may correspond to the number of first reception FEMs 400 installed in the electronic device. Although the embodiment of FIG. 4B illustrates only one first reception FEM 400 and one auxiliary port 450, a plurality of auxiliary ports 450 may be included in the second reception FEM 440 if a plurality of first reception FEMs 400 are included in the electronic device.

According to various embodiments, the electronic device 101 may transmit an SRS to an external electronic device. The processor 120 may transmit a control signal that makes a request for transmitting the SRS to the RFIC 210. The RFIC 210 may transmit the SRS to the transmission/reception FEM 370 in response to reception of the control information. The transmission/reception FEM 370 may identify transmission of the SRS through the first antenna 360 on the basis of the control information. Accordingly, the transmission/reception FEM 370 may control the switch 371 to transmit the SRS to the first reception FEM 400 electrically connected to the first antenna 360. When switching to a terminal of the switch 371 connected to the first reception FEM 400 is performed, the first reception FEM 400 and the transmission/reception FEM 370 may be connected through the SRS port 430 of the first reception FEM 400. The SRS may be transmitted to the DPDT switch 410 of the first reception FEM 400 through the SRS port 430. In the TDD-based communication system, the electronic device 101 may transmit the SRS to the external electronic device (for example, the electronic device 102 or the base station)

only in transmission slots. In the FDD-based communication system, the electronic device 101 may transmit the SRS to the external electronic device (for example, the electronic device 102 or the base station) only in transmission slots allocated to transmit the SRS. Accordingly, the DPDT switch 410 included in the first reception FEM 400 may correspond to the second state. For example, switching may be performed such that the first input terminal 411 connected to the first antenna 360 is electrically connected to the second output terminal 414 connected to the SRS port 430. Accordingly, the SRS may be transmitted to the first antenna 360 through the first input terminal 411, and may be radiated from the first antenna 360 and transmitted to the external electronic device.

According to various embodiments, the electronic device 101 may include an RF switch 460 for transmission calibration. The RF switch 460 may measure power at a time point at which the SRS is transmitted. For example, the DPDT switch 410 of the first reception FEM 400 may correspond to the first state. The first state may correspond to a state in which the first input terminal 411 and the first output terminal 413 are electrically connected and the second input terminal 412 and the second output terminal 414 are electrically connected. Accordingly, the SRS transmitted from the transmission/reception FEM 370 may be transmitted to the first reception FEM 400 through the SRS port 430 and may be transmitted to the second input terminal 412 by the DPDT switch 410 in the first state. Further, the SRS may be transmitted in serial to the coupler 310 connected to the second input terminal 412 and the ISO port 420 of the first reception FEM 400 connected to the coupler 310. Since the ISO port 420 of the first reception FEM 400 and the auxiliary port 450 of the second reception FEM 440 are electrically connected, the SRS may be transmitted to the second reception FEM 440 through the auxiliary port 450. Thereafter, the SRS may be transmitted to the RF switch 460 through a switch (for example, an MPMT switch) included in the second reception FEM 440. The RF switch 460 may change a path of the RF signal transmitted to the external electronic device (for example, the electronic device 102 or the base station) through the second antenna 470 to be connected to an external test device, a calibration device, or a measurement device for measuring the signal, so as to acquire a value of transmission power.

Figure 5:
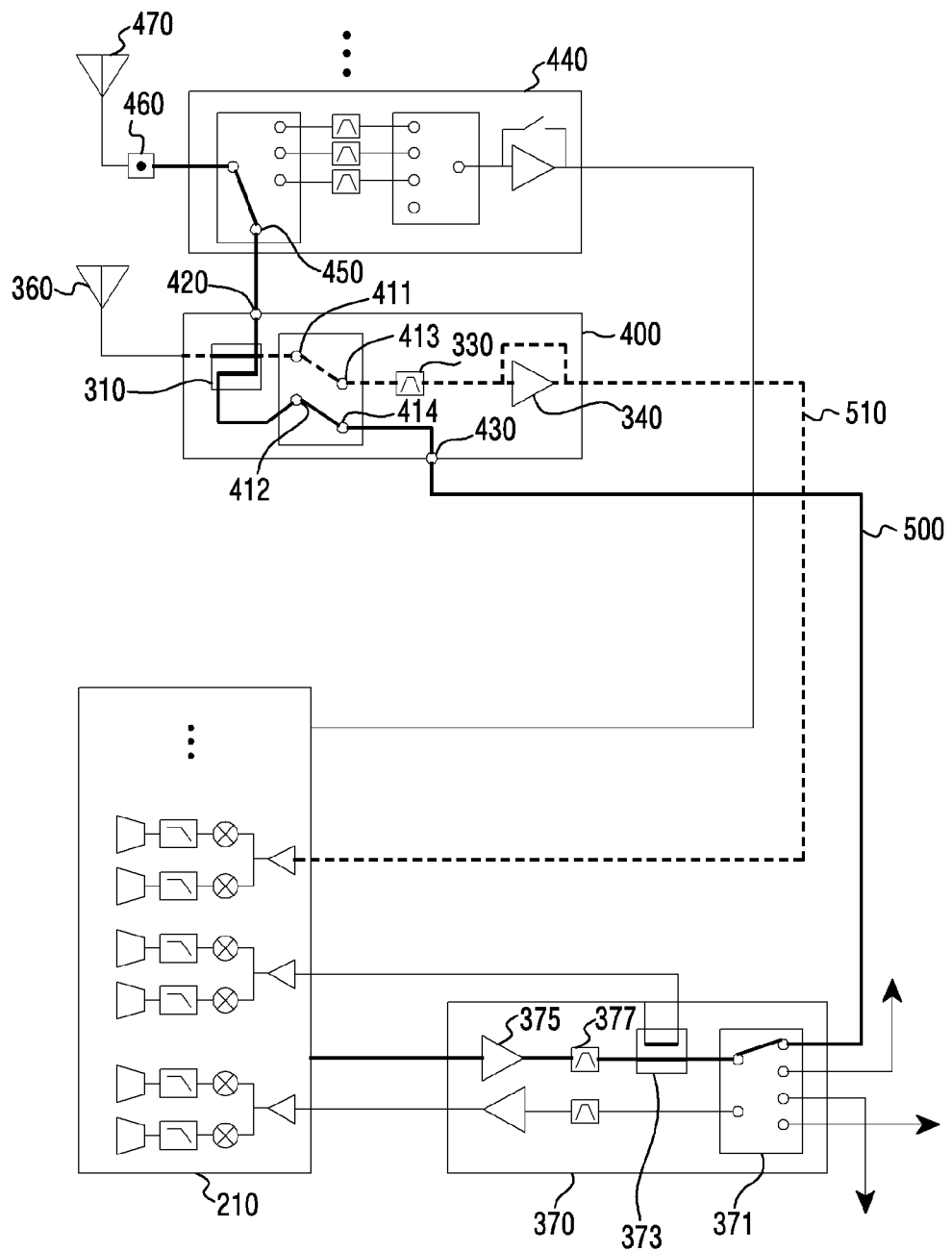
FIG. 5 illustrates the configuration of the electronic device for performing transmission calibration according to various embodiments of the disclosure.

FIG. 5 illustrates the configuration of the electronic device for performing transmission calibration according to various embodiments of the disclosure.

Referring to FIG. 5, an electrical path through which a calibration signal is transmitted may correspond to a line 500, and an electrical path through which a feedback signal coupled with the calibration signal is transmitted to the RFIC 210 may correspond to a line 510.

According to various embodiments, the calibration signal may be transmitted along the line 500. For example, the processor 120 may instruct the RFIC 210 to perform transmission calibration. The RFIC 210 may generate a calibration signal in response to the instruction. The generated calibration signal may be transmitted to the transmission/reception FEM 370. The calibration signal may be amplified by the amplifier 375 included in the transmission FEM of the transmission/reception FEM 370. The calibration signal may pass through a filter 377 preset in the transmission frequency band and thus a noise component other than the transmission frequency band may be removed. The calibration signal may be switched along the transmission path for performing calibration. For example, the processor 120 may indicate performance of calibration for the transmission path corresponding to the first antenna 360. A switch (for example, an MPMT switch) included in the transmission/reception FEM 370 may switch to transmit the calibration signal to the first reception FEM 400 connected to the first antenna 360. Switching may refer to switching to a terminal connected to the SRS port 430 of the first FEM 400 among a plurality of terminals included in the switch 371. The calibration signal may be transmitted to the first reception FEM 400 through the SRS port 430. The DPDT switch 410 of the first reception FEM 400 may switch to the first state in order to perform calibration for an electrical path within the electronic device 101, not to transmit the actual signal to the external electronic device. For example, the first input terminal 411 may be connected to the first output terminal 413, and the second input terminal 412 may be connected to the second output terminal 414. Accordingly, the calibration signal may pass through the coupler 310 from the second output terminal 414 connected to the SRS port 430 via the second input terminal 412. Since an opposite terminal of the coupler 310 is connected to the ISO port 420, the calibration signal may be transmitted to the second reception FEM 440 via the ISO port 420. The processor 120 may control MPMT switching to transmit the calibration signal to the RF switch 460 so as to measure transmission power at the antenna end of the calibration signal. That is, the calibration signal may be transmitted to the RF switch 460 through the auxiliary port 450 by switching of the MPMT switch. The RF switch 460 may measure a power value of the calibration signal by changing a path of the RF signal to be connected to an external tester device, a calibration device, or a measurement device for measuring a signal.

According to various embodiments, the feedback signal may be transmitted along the line 510. The feedback signal may be generated on a conducting wire different from a conducting wire through which the calibration signal included in the coupler 310 passes on the basis of a change in an ambient electromagnetic wave generated while the calibration signal passes through the coupler 310. The feedback signal may be transmitted to the first output terminal 413 through the first input terminal 411 by the DPDT switch 410 in the first state. The feedback signal transmitted to the first output terminal 413 may pass through the filter 330 and thus a noise signal other than a predetermined frequency band may be removed. The feedback signal may not pass through the amplifier 340. That is, feedback signal may bypass the amplifier 340. If the feedback signal passes through the amplifier 340, a characteristic of the conducting wire or the line through which the calibration signal passes cannot be properly reflected. Accordingly, the feedback signal may bypass the amplifier 340 and may be transmitted to the RFIC 210. The processor 120 may acquire a power value of the feedback signal received from the RFIC 210. The processor 120 may perform transmission calibration by comparing the power value of the feedback signal acquired from the RFIC 210 with a power value of the calibration signal measured by an external measurement device by the RF switch 460.

Figure 6:
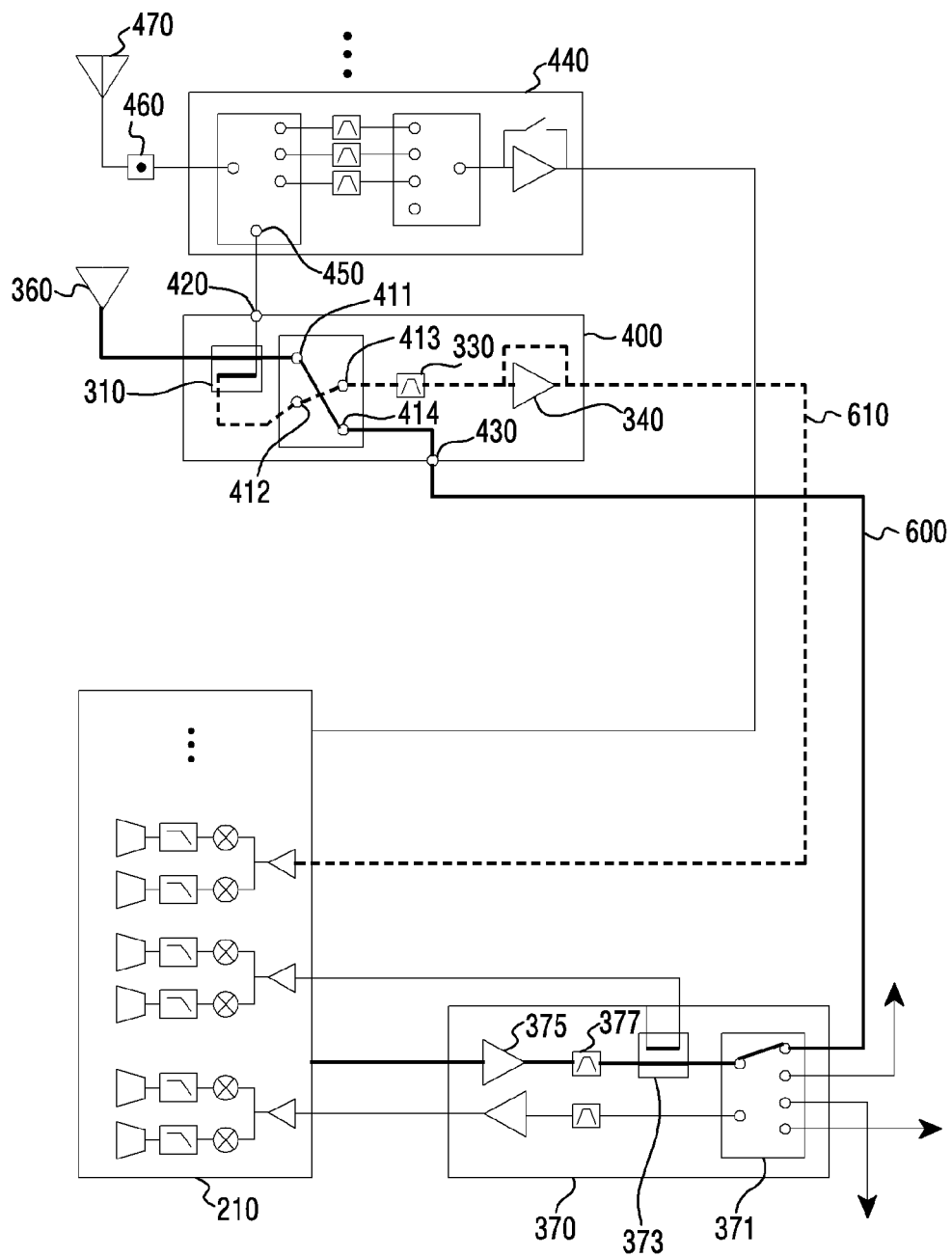
FIG. 6 illustrates the configuration of the electronic device for controlling closed loop power according to various embodiments of the disclosure.

FIG. 6 illustrates the configuration of the electronic device for controlling closed loop power according to various embodiments of the disclosure.

Referring to FIG. 6, an electrical path through which an SRS is transmitted may correspond to a line 600, and an electrical path through which a feedback signal coupled with the SRS is transmitted to the RFIC 210 may correspond to a line 610.

According to various embodiments, the SRS may be transmitted along the line 600. For example, the processor 120 may instruct an external electronic device to transmit the SRS to the RFIC 210. The RFIC 210 may generate the SRS and transmit the same to the transmission/reception FEM 370. The SRS may pass through the filter 377 and the amplifier 375 included in the transmission FEM of the transmission/reception FEM 370. Thereafter, the MPMT switch 371 included in the transmission/reception FEM 370 may perform switching to a terminal connected to an antenna designated to transmit the SRS. For example, when the SRS is transmitted to the base station through the first antenna 360, the MPMT switch 371 may switch to transmit the SRS to a terminal connected to the SRS port 430 of the first reception FEM 400. The SRS may be transmitted from the MPMT switch 371 to the DPDT switch 410 through the SRS port 430 of the first reception FEM 400. The DPDT switch 410 may switch to the second state during transmission slots of the TDD-based communication system. For example, the second output terminal 414 may be connected to the first input terminal 411. Accordingly, the SRS may be transmitted from the second output terminal 414 to the first input terminal 411 and may be transmitted to the external electronic device through the first antenna 360.

According to various embodiments, an electrical path through which a feedback signal is transmitted may correspond to the line 610. The feedback signal may be generated on the basis of an SRS transmitted through the first antenna 360. For example, the feedback signal may be generated by the coupler 310 while the SRS is transmitted from the first input terminal 411 to the first antenna 360. The generated feedback signal may be transmitted to the RFIC 210 along the line 610. According to an embodiment, since the DPDT switch 410 has switched to the second state, the second input terminal 412 may be connected to the first output terminal 413. Accordingly, the feedback signal generated by the coupler 310 may be transmitted to the filter 330 through the second input terminal 412 and the first output terminal 413. The feedback signal may bypass the amplifier 340 after passing through the filter 330. If the feedback signal passes through the amplifier 340, the feedback signal may be amplified and thus a value of power loss generated by a transmission line (for example, a transmission path or a reception path) cannot be accurately measured. The feedback signal may bypass the amplifier 340 and may be transmitted to the RFIC 210. The processor 120 may acquire the size of power loss generated by the transmission line on the basis of the power value of the feedback signal received by the RFIC 210 and adjust a transmission power value on the basis thereof. For example, target transmission power may be a power value required for transmitting the SRS through the first antenna 360. That is, the target transmission power may be a transmission power value required for successfully receiving the SRS by an external electronic device (for example, the base station). Accordingly, the processor 120 may perform control to generate the SRS with a power value obtained by adding the target transmission power value and power loss generated by the transmission line, that is, an offset. For example, the processor 120 may control a gain of at least one of a plurality of amplifiers included in the RFIC 210 or a plurality of amplifiers included in the transmission/reception FEM 370 to adjust the power value to the power value obtained by adding the target transmission power value and the offset power value.

Figure 7:
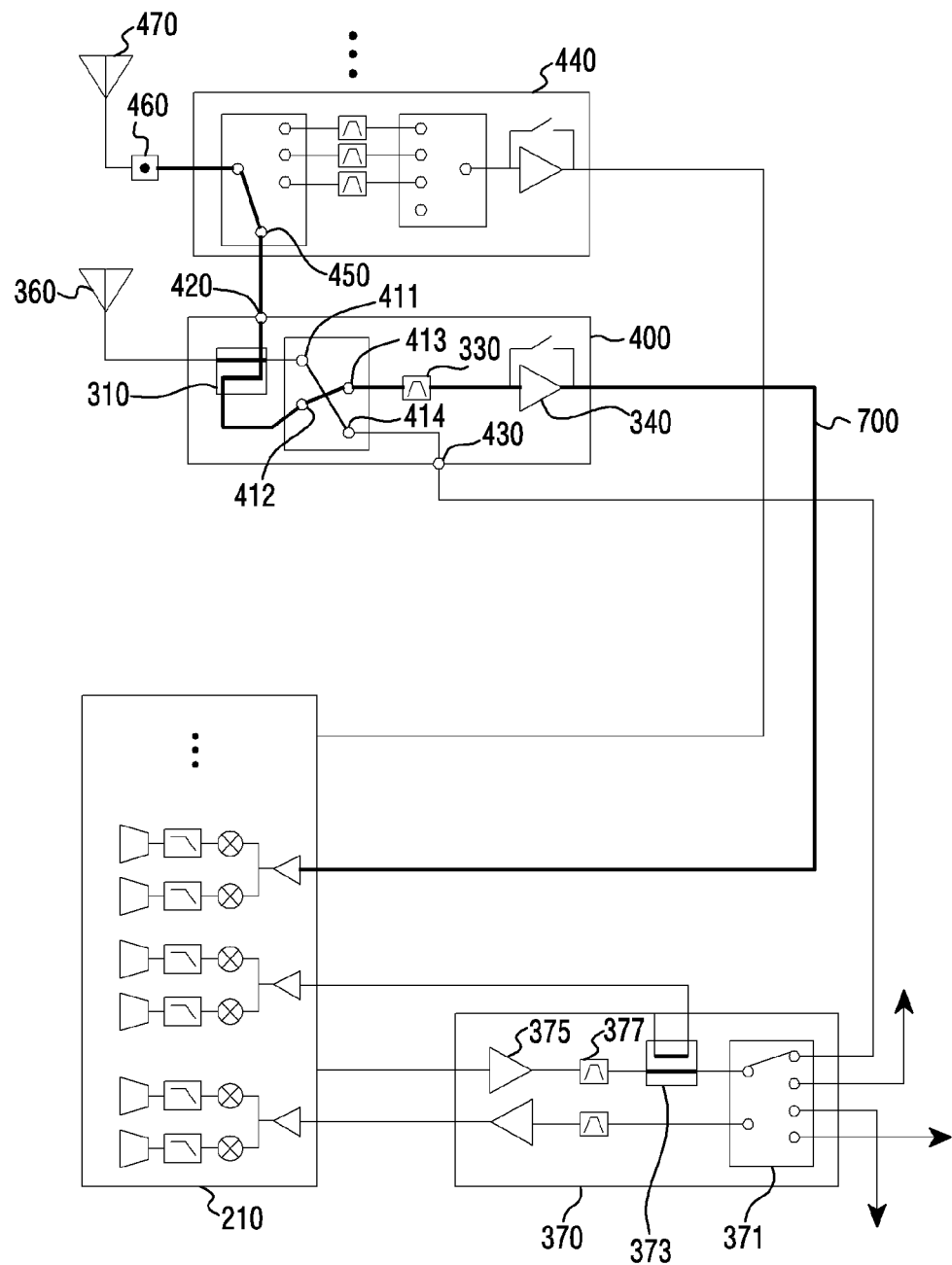
FIG. 7 illustrates the configuration of the electronic device for performing reception calibration according to various embodiments of the disclosure.

FIG. 7 illustrates the configuration of the electronic device for performing reception calibration according to various embodiments of the disclosure.

Referring to FIG. 7, an electrical path through which a calibration signal is received may correspond to a line 700.

According to various embodiments, the calibration signal may be transmitted through the RF switch 460. The calibration signal may correspond to a signal transmitted from an external electronic device (for example, a calibration device) to the electronic device 101 to perform reception calibration.

According to various embodiments, the processor 120 may measure a reception power value of the calibration signal. For example, the reception power value of the calibration signal may be referred to as Received Signal Received Power (RSRP).

According to various embodiments, the received calibration signal may be transmitted to the coupler 310 through the ISO port 420 of the first reception FEM 400 connected to the auxiliary port 450 of the second reception FEM 440. Thereafter, the calibration signal may be transmitted to the second input terminal 412 connected to the coupler 310. The DPDT switch 410 of the first reception FEM 400 may switch to the second state. That is, the second input terminal 412 may be connected to the first output terminal 413. Accordingly, the calibration signal may pass through a reception path through the second input terminal 412 and the first output terminal 413.

According to various embodiments, the calibration signal may pass through the filter 330 and the amplifier 340 included in the reception path. As the calibration signal passes through the amplifier 340, a power change of the actual reception path can be properly reflected. The calibration signal passing through the filter 330 and the amplifier 340 may be transmitted to the RFIC 210. The processor 120 may generate a table for the reception calibration in consideration of the power change of the reception path. That is, the calibration signal received by the RFIC 210 may reflect power loss of the power value generated as the signal transmitted by a calibration device through the RF switch 460 passes through the filter 330 and the power value acquired as the signal passes through amplifier 340. The processor 120 may receive a plurality of calibration signals and generate a table for reception calibration on the basis of a plurality of power values measured by the RFIC 210.

According to various embodiments, an electronic device (for example, the electronic device 101) may include: an antenna; a first switch functionally connected to the antenna and configured to perform switching to connect the antenna with a transmission path or a reception path; a first filter and a first amplifier configured to form the reception path; a second filter and a second amplifier configured to form the transmission path; a Radio Frequency Integrated Circuit (RFIC) connected to the reception path and the transmission path and configured to process an RF signal; and at least one processor configured to control the RFIC and the first switch such that a transmission signal generated by the RFIC is radiated from the antenna via the transmission path.

According to various embodiments, the electronic device (for example, the electronic device 101) may further include a plurality of antennas, a plurality of first switches, a plurality of reception paths, and a second switch, the second switch being configured to perform switching to connect the transmission path with one of the plurality of first switches, wherein the at least one processor is configured to control the RFIC, the plurality of first switches, and the second switch such that the transmission signal generated by the RFIC is radiated from one of the plurality of antennas via the transmission path.

According to various embodiments, the first switch may be a Single Pole Double Throw (SPDT) switch including three terminals, a first terminal of the three terminals may be connected to the antenna, a second terminal may be connected to the reception path, and a third terminal is connected to the transmission path, and the at least one processor may be configured to control the SPDT switch to be in a first state in which the first terminal and the second terminal are connected so that the antenna is connected to the reception path and control the SPDT switch to be in a second state in which the first terminal and the third terminal are connected so that the antenna is connected to the transmission path.

According to various embodiments, the electronic device may further include a first coupler connected between the transmission path and the second switch and a second coupler connected between the antenna and the first terminal of the SPDT switch, wherein the at least one processor may be configured to receive a first feedback signal proportional to a transmission signal acquired by the first coupler and a second feedback signal proportional to a transmission signal acquired by the second coupler and control a transmission power value based on a difference between an intensity of the first feedback signal and an intensity of the second feedback signal.

According to various embodiments, the electronic device may further include an RF switch connected between the first antenna and the second coupler.

According to various embodiments, the electronic device may further include a third coupler connected between the antenna and the first switch, wherein the third coupler includes a first conducting wire and a second conducting wire for performing a coupling function, the first switch may be a Double Pole Double Throw (DPDT) switch including four terminals, a first input terminal of the four terminals may be connected to the antenna through the first conducting wire of the third coupler, a second input terminal may be connected to the second conducting wire of the third coupler, a first output terminal may be connected to the reception path, and a second output terminal may be connected to the transmission path, and the at least one processor may be configured to control the DPDT switch to be in a third state and a fourth state, the third state corresponding to a state in which the first input terminal is connected to the first output terminal and the second input terminal is connected to the second output terminal, the fourth state corresponding to a state in which the first input terminal is connected to the second output terminal and the second input terminal is connected to the first output terminal.

According to various embodiments, the electronic device (for example, the electronic device 101) may further include: a second antenna; a second reception path configured to support legacy communication including at least one of a $2^{nd}$-generation communication network, a $3^{rd}$-generation communication network, and a Long Term Evolution (LTE) communication network; a third switch configured to switch to connect the second antenna with the second reception path or an auxiliary port; and an RF switch connected between the second antenna and the third switch, wherein the auxiliary port is connected to the second conducting wire of the third coupler.

According to various embodiments, the at least one processor may be configured to additionally control the DPDT switch so as to transmit a transmission signal generated by the RFIC to the antenna, acquire, through the reception path, a feedback signal coupled with the second conducting wire of the third coupler by the transmission signal transmitted to the first conducting wire of the third coupler, control the feedback signal to bypass the first amplifier of the reception path, acquire a size of power loss based on a power value of the acquired feedback signal, and adjust a transmission power value of the transmission signal based on the size of the power loss.

According to various embodiments, the at least one processor may be configured to control the transmission power value of the transmission signal to be a value obtained by adding target transmission power and the size of the power loss, and the target transmission power has a transmission power value required for successfully receiving the transmission signal by an external electronic device.

According to various embodiments, the at least one processor may be configured to additionally control the DPDT switch and the third switch so as to transmit a transmission signal generated by the RFIC to the RF switch, measure transmission power of the transmission signal by an external measurement device connected to the RF switch, acquire, through the reception path, a feedback signal coupled with the first conducting wire of the third coupler by the transmission signal transmitted to the second conducting wire of the third coupler, control the feedback signal to bypass the first amplifier of the first reception path, compare transmission power measured by the external measurement device with an intensity of the acquired feedback signal, and perform calibration for the transmission signal.

According to various embodiments, the at least one processor may be configured to additionally control the DPDT switch and the third switch so as to acquire a calibration signal transmitted from an external measurement device via the RF switch, the third switch, the third coupler, the DPDT switch, and the reception path, measure a reception power value of the received calibration signal, and perform calibration for the reception signal based on the reception power value.

According to various embodiments, the first coupler, the SPDT switch, and the first filter and the first amplifier forming the reception path may be included in a reception Front End Module (FEM) in a modularized form.

According to various embodiments, the third coupler, the DPDT switch, and the first filter and the first amplifier forming the reception path may be included in a reception Front End Module (FEM) in a modularized form.

According to various embodiments, the second filter and the second amplifier forming the transmission path may be included in a transmission Front End Module (FEM) in a modularized form.

According to various embodiments, the second filter and the second amplifier forming the transmission path and the second switch may be included in a transmission Front End Module (FEM) in a modularized form.

According to various embodiments, the second filter and the second amplifier forming the transmission path, the first filter and the first amplifier forming the reception path, and the second switch may be included in a transmission/reception Front End Module (FEM) in a modularized form.

According to various embodiments, the transmission signal may be a Sounding Reference Signal (SRS).

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
an antenna;
a first switch functionally connected to the antenna and configured to perform switching to connect the antenna with a transmission path or a reception path;
a first filter and a first amplifier configured to form the reception path, wherein the first filter and the first amplifier are included in a reception front end module (FEM) having a modularized form;
a second filter and a second amplifier configured to form the transmission path, wherein the second filter and the second amplifier are included in a transmission FEM having a modularized form separate from the reception FEM;
a Radio Frequency Integrated Circuit (RFIC) connected to the reception path and the transmission path and configured to process a Radio Frequency (RF) signal;
a coupler connected between the antenna and a terminal of the first switch, wherein the coupler includes a first conducting wire and a second conducting wire performing a coupling function; and
at least one processor configured to control the RFIC and the first switch such that a transmission signal generated by the RFIC is radiated from the antenna via the transmission path,
wherein the first switch is a Double Pole Double Throw (DPDT) switch including four terminals, a first input terminal of the four terminals is connected to the antenna through the first conducting wire of the coupler, a second input terminal is connected to the second conducting wire of the coupler, a first output terminal is connected to the reception path, and a second output terminal is connected to the transmission path; and
wherein the at least one processor is further configured to control the DPDT switch to be in a first state or a second state, the first state corresponding to a state in which the first input terminal is connected to the first output terminal and the second input terminal is connected to the second output terminal, the second state corresponding to a state in which the first input terminal is connected to the second output terminal and the second input terminal is connected to the first output terminal.

2. The electronic device of claim 1, wherein the transmission signal is a Sounding Reference Signal (SRS).

3. The electronic device of claim 1, further comprising: an RF switch connected between the antenna and the coupler.

4. The electronic device of claim 1, wherein the coupler and the DPDT switch are included in the reception FEM.

5. The electronic device of claim 1, wherein the at least one processor is further configured to:
additionally control the DPDT switch so as to transmit the transmission signal generated by the RFIC to the antenna, acquire, through the reception path, a feedback signal coupled with the second conducting wire of the coupler by the transmission signal transmitted to the first conducting wire of the coupler, control the feedback signal to bypass the first amplifier of the reception path, acquire a size of power loss based on a power value of the feedback signal, and adjust a transmission power value of the transmission signal based on the size of the power loss.

6. The electronic device of claim 5, wherein the at least one processor is further configured to:
control the transmission power value of the transmission signal to be a value obtained by adding a target transmission power and the size of the power loss, and the target transmission power has a transmission power value required for successfully receiving the transmission signal by an external electronic device.

7. The electronic device of claim 1, further comprising:
a second antenna;
a second reception path configured to support legacy communication including at least one of a $2^{nd}$-generation communication network, a $3^{rd}$-generation communication network, and a Long Term Evolution (LTE) communication network;
a third switch configured to switch to connect the second antenna with the second reception path or an auxiliary port; and
an RF switch connected between the second antenna and the third switch,
wherein the auxiliary port is connected to the second conducting wire of the coupler.

8. The electronic device of claim 7, wherein the at least one processor is further configured to:

additionally control the DPDT switch and the third switch so as to transmit the transmission signal generated by the RFIC to the RF switch, measure transmission power of the transmission signal by an external measurement device connected to the RF switch, acquire, through the reception path, a feedback signal coupled with the first conducting wire of the coupler by the transmission signal transmitted to the second conducting wire of the coupler, control the feedback signal to bypass the first amplifier of the reception path, compare transmission power measured by the external measurement device with an intensity of the feedback signal acquired, and perform calibration for the transmission signal.

9. The electronic device of claim 7, wherein the at least one processor is further configured to:
   additionally control the DPDT switch and the third switch so as to acquire a calibration signal transmitted from an external measurement device via the RF switch, the third switch, the coupler, the DPDT switch, and the reception path, measure a reception power value of the calibration signal, and perform calibration for a reception signal based on the reception power value.

10. The electronic device of claim 1, further comprising:
    a plurality of antennas;
    a plurality of first switches;
    a plurality of reception paths; and
    a second switch, the second switch being configured to perform switching to connect the transmission path with one of the plurality of first switches,
    wherein the at least one processor is further configured to:
       control the RFIC, the plurality of first switches, and the second switch such that the transmission signal generated by the RFIC is radiated from one of the plurality of antennas via the transmission path.

* * * * *